(12) United States Patent
Furuuchi et al.

(10) Patent No.: US 10,386,059 B2
(45) Date of Patent: Aug. 20, 2019

(54) DEHUMIDIFYING DEVICE AND LAMP

(71) Applicant: NITTO DENKO CORPORATION, Ibaraki-shi, Osaka (JP)

(72) Inventors: Koji Furuuchi, Ibaraki (JP); Ryoichi Matsushima, Ibaraki (JP); Hideki Hayama, Ibaraki (JP); Akiko Mimoto, Ibaraki (JP); Hiroyuki Nishii, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 15/528,371

(22) PCT Filed: Nov. 19, 2015

(86) PCT No.: PCT/JP2015/082566
§ 371 (c)(1),
(2) Date: May 19, 2017

(87) PCT Pub. No.: WO2016/080492
PCT Pub. Date: May 26, 2016

(65) Prior Publication Data
US 2017/0363278 A1 Dec. 21, 2017

(30) Foreign Application Priority Data
Nov. 19, 2014 (JP) ................. 2014-234874

(51) Int. Cl.
*F21V 31/03* (2006.01)
*F21S 43/00* (2018.01)
(Continued)

(52) U.S. Cl.
CPC .............. *F21V 31/03* (2013.01); *B01D 53/26* (2013.01); *F21S 41/148* (2018.01);
(Continued)

(58) Field of Classification Search
CPC ........ F21V 31/03; B01D 53/26; F21S 48/332; F21S 43/00; F21S 45/10; F21S 45/20;
(Continued)

(56) References Cited

U.S. PATENT DOCUMENTS

| 6,045,248 A | 4/2000 | Ashizawa |
| 2006/0171065 A1 | 8/2006 | Akamatsu et al. |

(Continued)

FOREIGN PATENT DOCUMENTS

| CN | 1212217 A | 3/1999 |
| JP | H05-103941 A | 4/1993 |

(Continued)

OTHER PUBLICATIONS

Jan. 12, 2016 Search Report issued in International Patent Application No. PCT/JP2015/082566.

(Continued)

*Primary Examiner* — Thomas M Sember
(74) *Attorney, Agent, or Firm* — Oliff PLC

(57) ABSTRACT

A vehicle lamp 1 is provided with: a ventilating unit 10 that is provided with a first opening 2a of a closed case 2, prevents entry of liquids and solids to an inside space S within the case 2, and allows circulation of air between the inside space S and an outside space of the vehicle lamp 1; and a dehumidifying unit 20 that is provided in a second opening 2b of the case 2 different in position from the first opening 2a and has an electrolysis dehumidifying element for discharging water vapor in the inside space S to the outside of the vehicle lamp 1 by electrolysis. Thus, a dehumidifying device and a lamp that can rapidly discharge water vapor that has entered the inside of a housing to the outside of the housing can be provided.

3 Claims, 5 Drawing Sheets

(51) Int. Cl.
  *B01D 53/26* (2006.01)
  *F21S 45/30* (2018.01)
  *F21S 45/33* (2018.01)
  *F21S 41/255* (2018.01)
  *F21S 41/32* (2018.01)
  *F21S 45/10* (2018.01)
  *F21S 45/20* (2018.01)
  *F21S 41/148* (2018.01)
  *F21Y 115/10* (2016.01)
  *F21S 41/20* (2018.01)
  *F21S 41/147* (2018.01)

(52) U.S. Cl.
  CPC ........... *F21S 41/255* (2018.01); *F21S 41/321* (2018.01); *F21S 43/00* (2018.01); *F21S 45/10* (2018.01); *F21S 45/20* (2018.01); *F21S 45/30* (2018.01); *F21S 45/33* (2018.01); *F21S 41/147* (2018.01); *F21S 41/28* (2018.01); *F21Y 2115/10* (2016.08)

(58) Field of Classification Search
  CPC ......... F21S 45/30; F21S 45/33; F21S 41/148; F21S 41/255; F21S 41/321
  See application file for complete search history.

(56) References Cited

U.S. PATENT DOCUMENTS

| | | |
|---|---|---|
| 2009/0268475 A1 | 10/2009 | Ball et al. |
| 2011/0016836 A1 | 1/2011 | Yano |
| 2015/0070927 A1 | 3/2015 | Kurahashi et al. |

FOREIGN PATENT DOCUMENTS

| | | |
|---|---|---|
| JP | 2001-269230 A | 10/2001 |
| JP | 2006-216157 A | 8/2006 |
| JP | 2011-519136 A | 6/2011 |
| JP | WO2013/175538 A1 | 11/2013 |
| JP | 2014-127381 A | 7/2014 |
| JP | 2014-161760 A | 9/2014 |
| JP | 2014-206490 A | 10/2014 |

OTHER PUBLICATIONS

May 28, 2018 Search Report issued in European Patent Application No. 15860261.5.
Jun. 25, 2019 Search Report issued in Chinese Patent Application No. 201580062135.3.

INSIDE SPACE ⟷ OUTSIDE OF LAMP

INSIDE SPACE ←→ OUTSIDE OF LAMP

DEHUMIDIFYING DEVICE AND LAMP

TECHNICAL FIELD

The present invention relates to a dehumidifying device and a lamp.

BACKGROUND ART

Conventionally, in lamps, such as vehicle lamps, or optical appliances, such as monitoring cameras, condensation of moisture in the inside of a housing containing components, such as a light source, and fogging of a lens associated with the condensation have been a problem.

In Patent Document 1, there is disclosed a technique in which a casing is provided with multiple ventilation holes for preventing condensation in the inside of the housing in a vehicle lamp, to thereby perform ventilation in the inside of the housing by air convection generated in the inside of the housing.

CITATION LIST

Patent Literature

Patent Document 1: National Publication of International Patent Application No. 2011-519136

SUMMARY OF INVENTION

Technical Problem

An object of the present invention is to provide a dehumidifying device and a lamp capable of rapidly discharging water vapor that has entered inside of a housing to an outside of the housing.

Solution to Problem

Under such an object, the present invention provides a dehumidifying device (1) including: a ventilating member (11) that is provided at a first position (2a) of a housing (2, 3) that is closed, the ventilating member preventing a liquid and a solid from entering inside (S) of the housing and circulating a gas between the inside and outside of the housing; and an electrolysis dehumidifying element (30) that is provided at a second position (2b) of the housing different from the first position, the electrolysis dehumidifying element discharging water vapor inside of the housing to the outside of the housing by electrolysis.

Here, the electrolysis dehumidifying element (30) is provided on a flow path of a gas entered the inside (S) of the housing (2, 3) from the ventilating member (11).

Moreover, the dehumidifying device further includes a guiding unit (9) that guides a gas entered the inside (S) of the housing (2, 3) through the ventilating member (11) to the electrolysis dehumidifying element (30).

Further, the electrolysis dehumidifying element (30) is provided on a vertically lower side in the housing (2, 3).

Further, from another standpoint, the present invention provides a lamp (1) including: a light source (4); a housing (2) that contains the light source; a lens (3) that outputs light from the light source to outside of the housing; a ventilating member (11) that is provided at a first position (2a) of the housing that is closed, the ventilating member preventing a liquid and a solid from entering inside (S) of the housing and circulating a gas between the inside and outside of the housing; and an electrolysis dehumidifying element (30) that is provided at a second position (2b) of the housing different from the first position, the electrolysis dehumidifying element discharging water vapor inside of the housing to the outside of the housing by electrolysis.

Here, the ventilating member (11) is provided at a position that allows most of the gas entered from the ventilating member to reach the electrolysis dehumidifying element (30) before reaching the lens (3).

Moreover, the electrolysis dehumidifying element (30) is provided on a vertically lower side than the light source (4).

Note that the above signs in this section are provided for exemplification in describing the present invention, and the present invention is not subjected to limited interpretation by these signs.

Advantageous Effects of Invention

According to the present invention, it is possible to provide a dehumidifying device and a lamp capable of rapidly discharging water vapor that has entered inside of a housing to an outside of the housing.

DESCRIPTION OF EMBODIMENTS

Hereinafter, an exemplary embodiment according to the present invention will be described in detail with reference to attached drawings.

[Overall Configuration of Vehicle Lamp]

Figure 1:
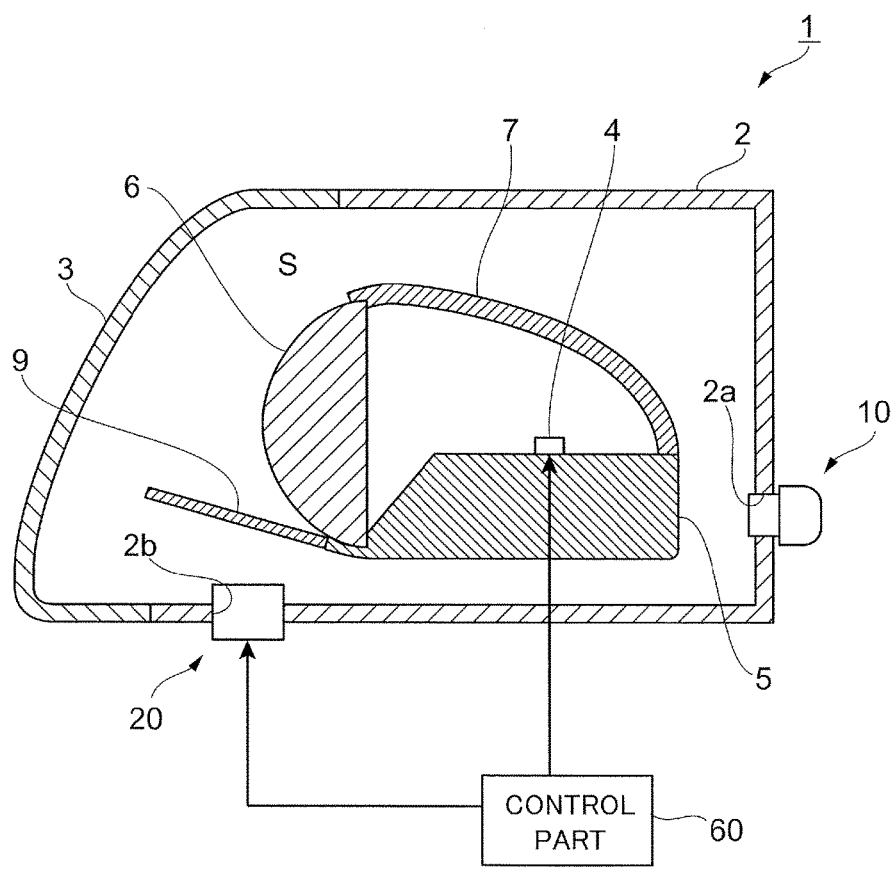
FIG. 1 is a diagram showing an overall configuration of a vehicle lamp to which an exemplary embodiment is applied.

FIG. 1 is a diagram showing an overall configuration of a vehicle lamp 1 to which the exemplary embodiment is applied.

The vehicle lamp 1 to which the exemplary embodiment is applied is used as a head lamp, a rear lamp, a brake lamp, a fog lamp, a direction indicator lamp, a taxing lamp, a parking lamp, etc., of various kinds of vehicles typified by, for example, automobiles. In FIG. 1, a head lamp is shown as an example of these lamps. Here, FIG. 1 is a cross-sectional view in which the vehicle lamp 1 is cut along a traveling direction of a vehicle, and the left side in FIG. 1 corresponds to a front side of the vehicle and the right side corresponds to a rear side of the vehicle.

The vehicle lamp 1 shown in FIG. 1 includes a case 2 that contains and protects components, such as an LED 4 to be described later, and a cover lens 3 that is attached to the case 2 and irradiates the outside of the vehicle lamp 1 with light from the LED 4. In the vehicle lamp 1, an inside space S, which is closed off from the outside, is formed by the case 2 and the cover lens 3. This increases the waterproofing property and dust-proofing property for each component contained in the case 2. Moreover, in the exemplary embodiment, a housing of the vehicle lamp 1 is configured with the case 2 and the cover lens 3.

In addition, the vehicle lamp 1 includes a ventilating unit 10 that performs ventilation between the inside space S and the outside of the vehicle lamp 1. Further, the vehicle lamp 1 includes a dehumidifying unit 20 that discharges water vapor or the like in the inside space S to the outside of the vehicle lamp 1, to thereby dehumidify the inside space S.

In the case 2, a first opening 2a and a second opening 2b, which are opened from the inside space S toward the outside of the vehicle lamp 1, are formed.

Here, the first opening 2a and the second opening 2b are formed at different positions of the case 2. Specifically, the first opening 2a is formed at a position in a vertically lower portion and on the side closer to the rear side of the vehicle in the case 2. On the other hand, the second opening 2b is formed at a position in a vertically lower portion and on the side, as compared to the first opening 2a, closer to the front side of the vehicle in the case 2. In this example, the position where the first opening 2a is formed corresponds to a first position, and the position where the second opening 2b is formed corresponds to a second position.

Then, in the vehicle lamp 1 of the exemplary embodiment, the ventilating unit 10 is attached to the first opening 2a of the case 2. Moreover, the dehumidifying unit 20 is attached to the second opening 2b of the case 2. To additionally describe, in the vehicle lamp 1 of the exemplary embodiment, the ventilating unit 10 and the dehumidifying unit 20 are attached to the positions on the case 2 that are different from each other.

Further, the vehicle lamp 1 includes the LED (Light Emitting Diode) 4, as an example of a light source, that emits light, and a support member 5 that supports the LED 4 and diffuses heat generated in the LED 4. Moreover, the vehicle lamp 1 includes a projector lens 6 that projects the light emitted from the LED 4 toward the front and a reflecting mirror 7 that reflects the light emitted from the LED 4 toward the projector lens 6. Then, in the vehicle lamp 1, the LED 4, the support member 5, the projector lens 6 and the reflecting mirror 7 are provided in the inside space S. Moreover, in the vehicle lamp 1, a gap is formed between the support member 5 and the case 2, as shown in FIG. 1.

In the vehicle lamp 1 shown in FIG. 1, the LED 4 emits light toward the front of the vehicle. Then, the light emitted from the LED 4 passes through the projector lens 6, and thereafter, the light is emitted toward the outside of the vehicle lamp 1 via the cover lens 3.

Still further, the vehicle lamp 1 includes a guide plate 9, as an example of a guide unit, that guides air entered the inside space S through the ventilating unit 10. As shown in FIG. 1, the guide plate 9 has a flat-plate shape, and is provided in the inside space S to extend from the support member 5 toward the cover lens 3. Moreover, as shown in FIG. 1, one of surfaces of the guide plate 9 faces the dehumidifying unit 20 attached to the case 2.

Note that guidance of the air by the guide plate 9 will be described in detail at a later stage.

Moreover, in the vehicle lamp 1 of the exemplary embodiment, lighting up and lighting down of the LED 4, a dehumidifying operation by the dehumidifying unit 20, and the like are performed based on control by a control part 60.

[Configuration of Ventilating Unit]

Figure 2A:
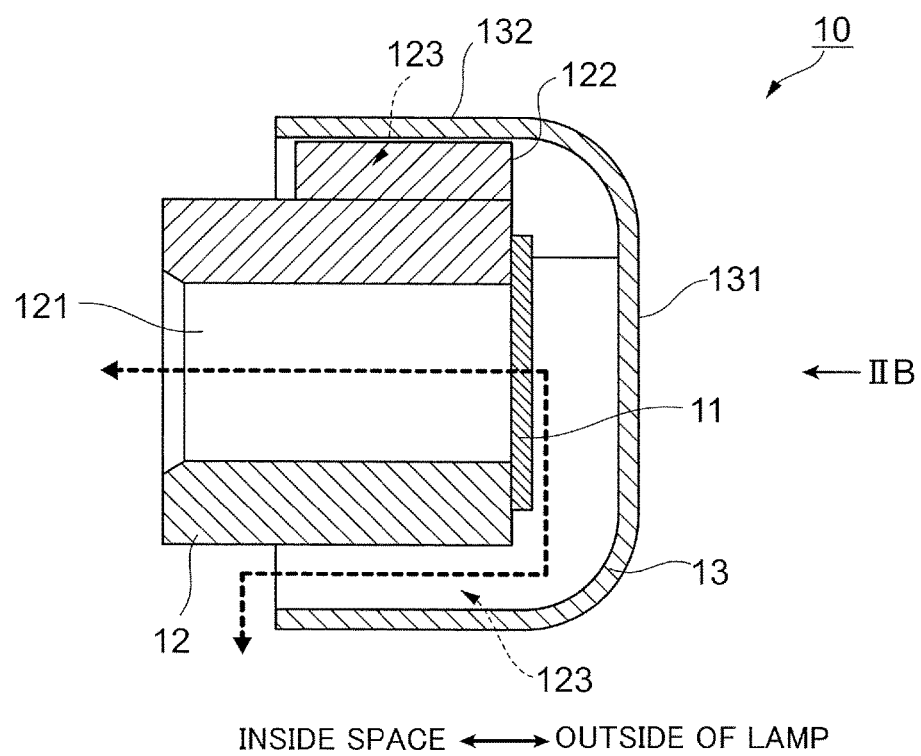
FIGS. 2A and 2B are diagrams for illustrating a configuration of a ventilating unit to which the exemplary embodiment is applied.
Figure 2B:
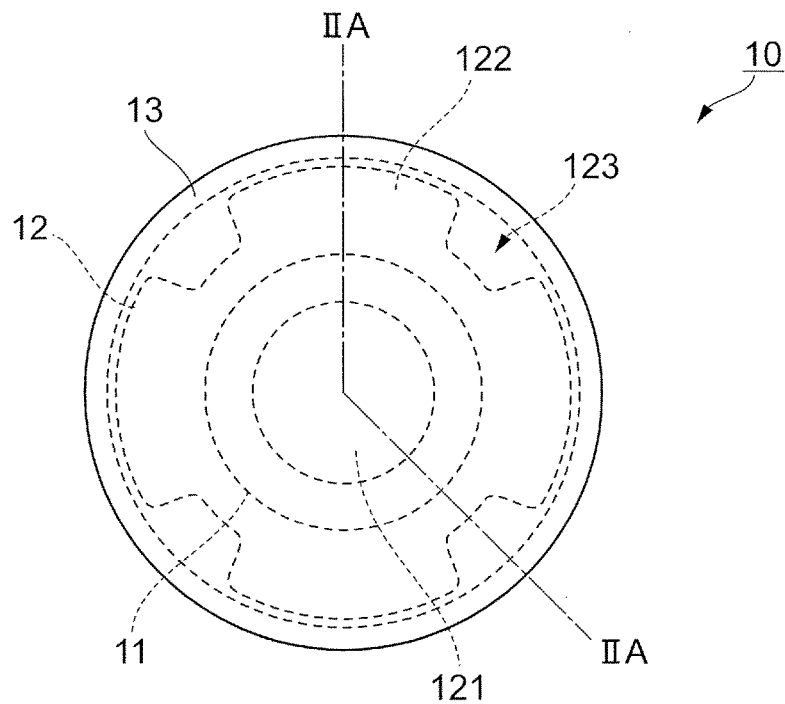

Subsequently, the ventilating unit 10 of the exemplary embodiment will be described. FIGS. 2A and 2B are diagrams for illustrating a configuration of the ventilating unit 10 to which the exemplary embodiment is applied. FIG. 2A is a cross-sectional view in which the ventilating unit 10 is cut along a ventilating direction in a ventilating path 121, which will be described later, and corresponds to the IIA-IIA cross sectional view in FIG. 2B. Moreover, FIG. 2B is a view as viewing FIG. 2A from the IIB direction.

As shown in FIG. 2A and the above-described FIG. 1, the ventilating unit 10 of the exemplary embodiment includes a ventilating film 11 in a film shape that performs ventilation between the inside space S and the outside of the vehicle lamp 1. Moreover, the ventilating unit 10 includes a ventilation attachment part 12 in a cylinder shape that holds the ventilating film 11 and is attached to the first opening 2a of the case 2, and a covering part 13 in a bottomed cylinder shape that covers the ventilating film 11 and the ventilation attachment part 12.

The ventilating film 11 of the exemplary embodiment is a film that prevents liquids, such as water, or solids, such as dust, from entering the inside space S, and allows flow of gases, such as air or water vapor. The ventilating film 11 can be configured with a porous film or the like having multiple holes formed by a stretching method, an extraction method or the like. As the porous film used for the ventilating film 11, for example, a polytetrafluoroethylene (PTFE) porous film can be provided. The PTFE porous film is preferable in terms of maintaining a ventilating property even with a small area and having high capability of preventing water, dust or the like from passing through.

Moreover, when the porous film is used as the ventilating film 11 of the exemplary embodiment, an average pore diameter of the holes formed in the porous film is normally in a range from 0.01 μm or more to 100 μm or less, preferably in a range from 0.1 μm or more to 50 μm or less, and more preferably in a range from 0.5 μm or more to 10 μm or less.

When the average pore diameter of the porous film used as the ventilating film 11 is less than 0.01 μm, the air is less likely to pass through the ventilating film 11. In this case, for example, when the temperature in the inside space S becomes high and the air in the inside space S expands due to heat generation in the LED 4, the case 2, the cover lens 3 or the like is likely to be broken. On the other hand, when the average pore diameter of the porous film used as the ventilating film 11 exceeds 100 μm, dust or the like is likely to intrude into the inside space S through the ventilating film 11.

The thickness of the ventilating film 11 is not particularly limited; however, for example, the thickness can be set in a range from 10 μm or more to 1000 μm or less.

When the thickness of the ventilating film 11 is extremely small, strength of the ventilating film 11 is likely to be reduced. Moreover, when the thickness of the ventilating film 11 is extremely large, the ventilating unit 10 is likely to be large-sized.

Moreover, it is preferable to apply liquid repellent treatment, such as water repellent treatment or oil repellent treatment to the surface of the ventilating film 11 (in particular, the surface facing the outside of the vehicle lamp 1 when the ventilating unit 10 is attached to the first opening 2a of the case 2). By applying the liquid repellent treatment to the ventilating film 11, adhesion of contamination or the like to the ventilating film 11 is suppressed. As a result, clogging of the ventilating film 11 is suppressed, and accordingly, deterioration of ventilating property caused by the ventilating unit 10 is suppressed.

Note that the liquid repellent treatment for the ventilating film 11 can be performed by coating the surface of the ventilating film 11 with a liquid repellent agent, which has, for example, a compound including a hydrocarbon group saturated with fluoride (perfluoro-alkyl group) in a side chain and has a main chain of acrylic series, methacrylic series, silicone series or the like as a component. The method of coating the surface of the ventilating film 11 is not particularly limited; however, for example, gravure coating, spray coating, kiss coating, dipping or the like can be adopted.

The ventilation attaching part 12 has a cylindrical shape as a whole, and the ventilating path 121 in a columnar shape, through which the air having passed the ventilating film 11 or the air to be discharged from the inside space S passes, is formed inside thereof. The ventilating path 121 is, in a state where the ventilating unit 10 is attached to the case 2 (refer to FIG. 1) of the vehicle lamp 1 (refer to FIG. 1), extending in a direction heading from the outside of the vehicle lamp 1 toward the inside space S. More specifically, of the ventilating path 121, an end portion closer to the inside space S faces toward the dehumidifying unit 20 attached to the case 2 of the vehicle lamp 1.

Moreover, the ventilation attaching part 12 includes multiple (in this example, four) protruding parts 122 that protrude from an outer circumferential surface. Each protruding part 122 is provided with the gap 123 with an adjacent protruding part 122.

Then, the ventilating film 11 is attached to the ventilation attaching part 12 so that, of the ventilating path 121, one end portion positioned closer to the outside of the vehicle lamp 1 is closed. The method of attaching the ventilating film 11 to the ventilation attaching part 12 is not particularly limited; however, for example, methods such as thermal fusion bonding, ultrasonic welding, and bonding using a bonding agent, an adhesive agent or the like can be provided.

The covering part 13 includes a space in a columnar shape formed inside thereof and, as described above, has a bottomed cylindrical shape as a whole. Specifically, the covering part 13 includes a bottom surface 131 in a circular shape and a side surface 132 in a cylindrical shape extending from an outer edge of the bottom surface 131.

The covering part 13 is attached to an outer circumference of the ventilation attaching part 12 to cover the ventilating film 11 attached to the ventilation attaching part 12. By the covering part 13, adhesion of contamination or the like to the surface of the ventilating film 11 is suppressed, and also, breakage of the ventilating film 11 is suppressed.

In the ventilating unit 10, the side surface 132 of the covering part 13 is configured to contact the protruding parts 122 of the ventilation attaching part 12. This causes, in the ventilating unit 10, the covering part 13 to be positioned with respect to the ventilation attaching part 12. Then, in the ventilating unit 10, a predetermined gap is formed between the ventilating film 11 and the bottom surface 131 of the covering part 13.

The ventilation attaching part 12 and the covering part 13 are configured with, for example, a thermoplastic elastomer, a thermoplastic resin or the like. Note that the ventilation attaching part 12 and the covering part 13 may be configured with the same material, or materials different from each other.

Then, the ventilating unit 10 of the exemplary embodiment is mounted to the vehicle lamp 1 (refer to FIG. 1) by attaching the ventilation attaching part 12 to the first opening 2a (refer to FIG. 1) of the case 2 (refer to FIG. 1). Note that the method of attaching the ventilation attaching part 12 to the first opening 2a of the case 2 is not particularly limited; however, for example, an attaching method that performs thread cutting to the first opening 2a and the ventilation attaching part 12, to thereby screw the ventilation attaching part 12 into the first opening 2a, a method of press fitting the ventilation attaching part 12 into the first opening 2a, or the like can be appropriately adopted.

Subsequently, operations of the ventilating unit 10 will be described. In the exemplary embodiment, when a pressure difference occurs between the outside of the vehicle lamp 1 and the inside space S of the vehicle lamp 1, a gas flows through the ventilating unit 10 from the outside of the vehicle lamp 1 toward the inside space S, or, from the inside space S toward the outside of the vehicle lamp 1.

For example, when a gas flows from the outside of the vehicle lamp 1 toward the inside space S, as indicated by a broken line in FIG. 2A, the gas enters the inside of the ventilating unit 10 through the gap 123 formed between the ventilation attaching part 12 and the covering part 13. Then, the gas entered the ventilating unit 10 passes through the ventilating film 11 from the right toward the left in the figure, and enters the inside space S through the ventilating path 121 formed in the ventilation attaching part 12.

On the other hand, when a gas flows from the inside space S toward the outside of the vehicle lamp 1, as indicated by the broken line in FIG. 2A, the gas moves through the ventilating path 121 formed in the ventilation attaching part 12, and thereafter, passes through the ventilating film 11 from the left toward the right in the figure. Then, the gas passed through the ventilating film 11 passes the gap 123 formed between the ventilation attaching part 12 and the covering part 13, to be discharged to the outside of the vehicle lamp 1.

This eliminates the pressure difference occurred between the outside of the vehicle lamp 1 and the inside space S, and thereby breakage of the case 2 or the cover lens 3 of the vehicle lamp 1 is suppressed. To put it another way, the ventilating unit 10 of the exemplary embodiment has a function as an internal pressure adjusting member that suppresses pressure fluctuations in the inside space S in the vehicle lamp 1.

[Configuration of Dehumidifying Unit]

Figure 3:
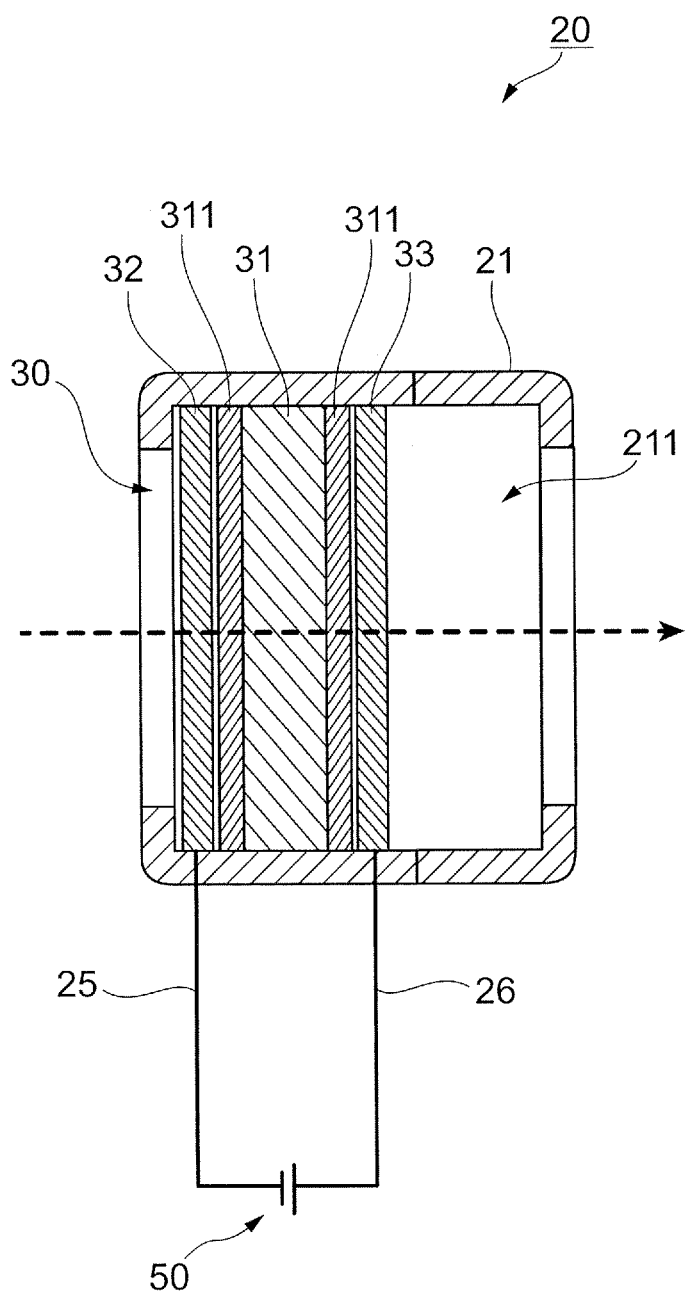
FIG. 3 is a diagram for illustrating a configuration of a dehumidifying unit to which the exemplary embodiment is applied.

Subsequently, the dehumidifying unit 20 of the exemplary embodiment will be described. FIG. 3 is a diagram for illustrating a configuration of the dehumidifying unit 20 to which the exemplary embodiment is applied, and is a cross-sectional view in which the dehumidifying unit 20 is cut along the thickness direction of the electrolysis dehumidifying element 30, which will be described later. Note that FIG. 3 shows the dehumidifying unit 20 shown in FIG. 1 in the state being rotated 90 degrees in the counterclockwise direction.

The dehumidifying unit 20 of the exemplary embodiment includes the electrolysis dehumidifying element 30 that dehumidifies the inside space S by electrolyzing water vapor or others in the inside space S. Moreover, the dehumidifying unit 20 includes a dehumidification attachment part 21 that holds the electrolysis dehumidifying element 30 and is attached to the second opening 2b of the case 2.

In the dehumidification attachment part 21, a hole 211 extending from the inside space S to the outside of the vehicle lamp 1 is formed, and the electrolysis dehumidifying element 30 is held in the hole 211. Moreover, the dehumidification attachment part 21 is configured with, for example, a thermoplastic elastomer, a thermoplastic resin or the like. Then, the dehumidifying unit 20 of the exemplary embodiment is mounted to the vehicle lamp 1 (refer to FIG. 1) by attaching the dehumidification attachment part 21 to the second opening 2b (refer to FIG. 1) of the case 2 (refer to FIG. 1). Note that the method of attaching the dehumidification attachment part 21 to the second opening 2b of the case 2 is not particularly limited; however, for example, an attaching method that performs thread cutting to the second opening 2b and the dehumidification attachment part 21, to thereby screw the dehumidification attachment part 21 into the second opening 2b, a method of press fitting the dehumidification attachment part 21 into the second opening 2b, or the like can be appropriately adopted.

Still further, the dehumidifying unit 20 includes a first conductor wire 25 connected to a first electrode layer 32, which will be described later, of the electrolysis dehumidifying element 30 and a second conductor wire 26 connected to a second electrode layer 33. The first conductor wire 25 and the second conductor wire 26 are connected to an external power supply 50 provided outside of the dehumidifying unit 20.

Then, the dehumidifying unit 20 of the exemplary embodiment performs dehumidification of the inside space S of the vehicle lamp 1 based on the control by the control part 60.

The electrolysis dehumidifying element 30 of the exemplary embodiment includes an electrolyte layer 31 made of electrolytes, the first electrode layer 32 laminated on one of surfaces of the electrolyte layer 31 (the surface facing toward the inside space S when the dehumidifying unit 20 is attached to the second opening 2b of the case 2), and the second electrode layer 33 laminated on the other surface of the electrolyte layer 31 (the surface opposite to the one of surfaces). This brings the electrolyte layer 31 into a state being sandwiched by the first electrode layer 32 and the second electrode layer 33. To put it another way, the electrolysis dehumidifying element 30 of the exemplary embodiment includes a configuration in which the first electrode 32, the electrolyte layer 31 and the second electrode layer 32 are laminated in order from the inside space S side.

The electrolyte layer 31 of the exemplary embodiment has a film-like or plate-like shape.

Moreover, the electrolyte layer 31 is configured with electrolytes having protonic conductivity. As the electrolytes constituting the electrolyte layer 31, for example, a fluorine-based proton conducting electrolyte, such as perfluoroalkyl sulfonic acid resin, or a polymer electrolyte resin that introduces a proton conducting group, such as a sulfonic acid group or a phosphoric acid group, into polyether ketone, polyether ether ketone, polyether sulfone or the like can be used.

The electrolyte layer 31 has a property to adsorb moisture contained in the air (water vapor). Moreover, the electrolyte layer 31 has a property not to allow gases to permeate.

Further, on the surfaces of the electrolyte layer 31 (surfaces facing the first electrode layer 32 and the second electrode layer 33), catalytic layers 311 for promoting an electrolysis reaction in the electrolyte layer 31 are formed. As the catalytic layer 311, elemental metals of elements of the platinum group, such as Pt, Ru, Rh, Ir, Os or Pd, or alloys containing these elements of the platinum group can be provided. Among them, it is preferable to use Pt having high catalytic activity.

In the electrolysis dehumidifying element 30 of the exemplary embodiment, electrolysis of water in the electrolyte layer 31 is more likely to be facilitated by forming the catalytic layers 311 on the surfaces of the electrolyte layer 31, and therefore, dehumidification of the inside space S is performed more rapidly.

The first electrode layer 32 and the second electrode layer 33 are used for applying a predetermined voltage to the electrolyte layer 31. In the electrolysis dehumidifying element 30 of the exemplary embodiment, the first electrode layer 32 is electrically connected to one of the surfaces, which faces toward the inside space S, of the electrolyte layer 31 and operates as an anode. Moreover, the second electrode layer 33 is electrically connected to the other surface (the surface opposite to the one surface to which the first electrode layer 32 is connected) of the electrolyte layer 31 and operates as a cathode.

The first electrode layer 32 and the second electrode layer 33 are configured with a material having conductivity. As the first electrode layer 32 and the second electrode layer 33, for example, a metal material in a mesh shape or a fiber shape can be used. By adopting the metal material in the mesh shape or the fiber shape as the first electrode layer 32, moisture (water vapor) in the inside space S is likely to be adsorbed by the electrolyte layer 31 through the first electrode layer 32. Moreover, by adopting the metal material in the mesh shape or the fiber shape as the second electrode layer 33, hydrogen, water vapor or others generated by a reduction reaction in the second electrode layer 33, which will be described later, are likely to be discharged to the outside of the vehicle lamp 1 through the second electrode layer 33.

Moreover, the first electrode layer 32 and the second electrode layer 33 may be configured with metal plates having multiple small holes formed thereon. In this case, by the small holes formed on the metal plates, the ventilating properties of the first electrode layer 32 and the second electrode layer 33 are secured.

Further, the first electrode layer 32 and the second electrode layer 33 may be configured with a porous material having conductivity and ventilating property. As such a porous material, for example, a porous carbon sheet holding metal particles can be provided.

Here, in the dehumidifying unit 20 of the exemplary embodiment, the electrolysis dehumidifying element 30 is attached to the dehumidification attachment part 21 with no gap being created. Moreover, as described above, the electrolysis dehumidifying element 30 of the exemplary embodiment has a property not to allow water vapor, air or others to permeate in a non-energization state. Therefore, the dehumidifying unit 20 of the exemplary embodiment has airtightness between the inside space S and the outside of the vehicle lamp 1 in the non-energization state.

To put it another way, the vehicle lamp 1 of the exemplary embodiment is configured not to allow gases, such as water vapor or air, to enter the inside space S through the dehumidifying unit 20.

Subsequently, operations of the dehumidifying unit 20 will be described. In the dehumidifying unit 20 of the exemplary embodiment, based on the control by the control part 60 (refer to FIG. 1), a DC voltage is applied to the electrolysis dehumidifying element 30 by the external power supply 50 at predetermined timing. Specifically, by the external power supply 50, the DC voltage is applied continuously or intermittently between the first electrode layer 32 and the second electrode layer 33 of the electrolysis dehumidifying element 30 via the first conductor wire 25 and the second conductor wire 26.

Consequently, in the first electrode layer 32 operating as the anode, water supplied from the inside space S or the like is electrolyzed as shown in the following reaction formula (1). In other words, in the first electrode layer 32, water ($H_2O$) is electrolyzed to generate proton (hydrogen ion $H^+$) and oxygen ($O_2$).

$$H_2O \to 1/2 O_2 + 2H^+ + 2e^- \quad (1)$$

Oxygen generated in the first electrode layer 32 is released from the surface of the first electrode layer 32 to the inside space S.

Moreover, proton (hydrogen ion) generated in the first electrode layer 32 moves within the electrolyte layer 31 and reaches the second electrode layer 33.

In the second electrode layer 33 operating as the cathode, proton (hydrogen ion) supplied from the first electrode layer 32 through the electrolyte layer 31 is subjected to the reduction reaction with oxygen contained in air, and thereby water (water vapor) is generated as shown in the reaction formula (2).

$$1/2 O_2 + 2H^+ + 2e^- \to H_2O \quad (2)$$

Moreover, in the second electrode layer 33, proton (hydrogen ion) supplied from the first electrode layer 32 through the electrolyte layer 31 is directly reduced, and thereby hydrogen is generated in some cases as shown in the reaction formula (3).

$$2H^+ + 2e^- \to H_2 \quad (3)$$

Then, water (water vapor) or hydrogen generated in the second electrode layer 33 is released from the surface of the second electrode layer 33 to the outside of the vehicle lamp 1 through the hole 211 in the dehumidification attachment part 21.

As described above, in the vehicle lamp 1 of the exemplary embodiment, the ventilating unit 10 and the dehumidifying unit 20 are provided at the different positions on the case 2.

Moreover, in terms of the emission direction of light from the LED 4 of the vehicle lamp 1, in the exemplary embodiment, the ventilating unit 10, the LED 4, the dehumidifying unit 20 and the cover lens 3 are arranged in order from an upstream side toward a downstream side in the emission direction of light.

Further, in the state where the vehicle lamp 1 is mounted to the vehicle, in the vehicle lamp 1 of the exemplary embodiment, the ventilating unit 10 and the dehumidifying unit 20 are provided on a vertically lower side of the case 2.

By the way, conventionally, in the vehicle lamp 1, such as a head lamp, condensation or fogging of the cover lens 3 (a phenomenon in which the cover lens 3 becomes white and cloudy due to attachment of minute water droplets) caused by increase of humidity in the inside space S has been a problem. As the method of suppressing increase of humidity in the inside space S of the vehicle lamp 1, sealing of the inside space S of the vehicle lamp 1 with the case 2 and the cover lens 3 is most effective. However, since plastic or others constituting the case 2 or the cover lens 3 have hygroscopicity, it is impossible to completely suppress entry of moisture to the inside space S.

Moreover, in the case where the inside space S is sealed by the case 2 and the cover lens 3 in the vehicle lamp 1, when the pressure in the inside space S is sharply increased due to expansion of the air in the inside space S or the pressure in the inside space S is sharply decreased due to contraction of the air in the inside space S, there is a possibility that the case 2 or the cover lens 3 is broken.

Consequently, for suppressing rapid fluctuations of pressure in the inside space S, the vehicle lamp 1 is normally provided with a ventilating means, such as the ventilating unit 10, that performs ventilation between the inside space S and the outside of the vehicle lamp 1.

By the way, in general, a light source, such as the LED 4, provided to the vehicle lamp 1 generates heat and has high temperature when being lighted up. Therefore, when the LED 4 is lighted up in the vehicle lamp 1, the air in the inside space S of the vehicle lamp 1 is warmed.

Thereafter, when the LED 4 is lighted down, heat generation in the LED 4 is stopped, and the warmed air in the inside space S is cooled and contracted. With this, the pressure in the inside space S becomes temporarily low as compared to the outside of the vehicle lamp 1. As a result, in the vehicle lamp 1 including the ventilating unit 10, in response to the pressure difference between the outside of the vehicle lamp 1 and the inside space S, the air enters the inside space S from the outside of the vehicle lamp 1 through the ventilating unit 10.

Here, when the humidity of the outside of the vehicle lamp 1, humid air containing water vapor enters the inside space S through the ventilating unit 10. Then, when the temperature in the inside space S falls below the dew point, condensation or fogging occurs on the cover lens 3.

In particular, for example, when the cover lens 3 is cooled from the outside by raindrops in rainy weather, or, when the vehicle lamp 1 is left under a low-temperature condition for a long time, since the water vapor entered the inside space S is cooled by contacting the cover lens 3, condensation or fogging is more likely to occur on the cover lens 3.

Moreover, when the LED 4 is used as the light source, an infrared component is normally not contained in the light emitted from the LED 4 and water droplets or the like attached to the cover lens 3 are less likely to be heated, and accordingly, condensation or fogging occurred on the cover lens 3 is less likely to be eliminated.

To suppress condensation or fogging on the cover lens 3, it is desirable to rapidly discharge the water vapor entered the inside space S to the outside of the vehicle lamp 1.

As the method of discharging the water vapor entered the inside space S to the outside of the vehicle lamp 1, for example, a method that discharges the water vapor through the ventilating unit 10 by use of air convection occurring in the inside space S, or the like, can be provided.

However, in the method that discharges the water vapor through the ventilating unit 10 by use of the air convection, there is a possibility that difficulty is created in discharging the water vapor sufficiently depending on, for example, relations of pressure and temperature between the inside space S and the outside of the vehicle lamp 1, the amount of water vapor entered the inside space S, or others. In this case, condensation or fogging is likely to occur on the cover lens 3.

[Dehumidifying Operations in Vehicle Lamp]

For this, in the vehicle lamp 1 of the exemplary embodiment, by the ventilating unit 10 and the dehumidifying unit 20 attached to different positions of the case 2, the water vapor entered the inside space S is rapidly discharged to the outside of the vehicle lamp 1, and thereby condensation or fogging on the cover lens 3 is suppressed.

Subsequently, dehumidifying operations in the vehicle lamp 1 of the exemplary embodiment will be described.

Figure 4:
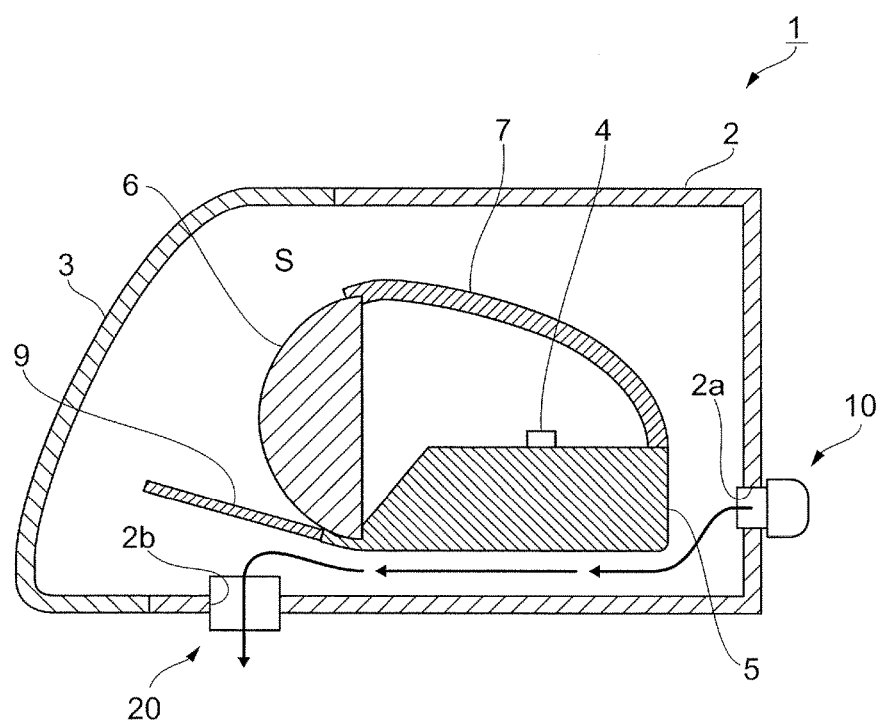
FIG. 4 is a diagram showing a state in which a dehumidifying operation is performed in the vehicle lamp to which the exemplary embodiment is applied.

In the vehicle lamp 1 of the exemplary embodiment, the dehumidifying unit 20 is energized by the external power supply 50 at predetermined timing based on the control by the control part 60, to thereby perform dehumidification of the inside space S. Here, a description will be given of a case in which the dehumidifying operation is performed at timing of lighting down the LED 4 as the predetermined timing in the vehicle lamp 1. FIG. 4 is a diagram showing a state in which the dehumidifying operation is performed in the vehicle lamp 1 to which the exemplary embodiment is applied.

In the vehicle lamp 1 of the exemplary embodiment, a DC voltage is applied to the electrolysis dehumidifying element 30 of the dehumidifying unit 20 by the external power supply 50 (refer to FIG. 3) based on the control by the control part 60 (refer to FIG. 1) on the timing of lighting down the LED 4.

Moreover, when the LED 4 is lighted down in the vehicle lamp 1, as described above, the temperature in the inside space S is decreased and the air in the inside space S is contracted, and accordingly, the pressure in the inside space S becomes low as compared to the outside of the vehicle lamp 1. Then, due to the pressure difference between the inside space S and the outside of the vehicle lamp 1, as shown in FIG. 4, the air of the outside of the vehicle lamp 1 enters the inside space S through the above-described ventilating film 11 (refer to FIG. 2) of the ventilating unit 10.

Here, in the vehicle lamp 1, until the LED 4 is lighted down, the air in the inside space S is heated by heat generation of the LED 4. Therefore, at the timing of lighting down the LED 4, the temperature of the air in the inside space S is high as compared to the air of the outside of the vehicle lamp 1. Moreover, in the vehicle lamp 1 of the exemplary embodiment, the ventilating unit 10 is provided on the vertically lower side of the inside space S as compared to the LED 4.

Consequently, the air of low temperature entered the inside space S from the ventilating unit 10 moves in the vertically lower side of the inside space S from the rear side to the front side of the vehicle, as shown in FIG. 4, due to difference in density with the air existed in the inside space S. Here, as described above, in the vehicle lamp 1 of the exemplary embodiment, the gap is formed between the support member 5 and the case 2. Consequently, the air entered the inside space S from the ventilating unit 10 moves between the support member 5 and the case 2 from the rear side to the front side of the vehicle. In other words, in the vehicle lamp 1 of the exemplary embodiment, a flow path for the air entered the inside space S from the ventilating unit 10 is formed between the support member 5 and the case 2 in the vertically lower portion of the inside space S.

In the vehicle lamp 1 of the exemplary embodiment, as described above, the dehumidifying unit 20 is mounted to the second opening 2b formed in the vertically lower portion of the case 2, the second opening 2b being closer to the front side of the vehicle than the first opening 2a to which the ventilating unit 10 is mounted. To put it another way, in the vehicle lamp 1, the dehumidifying unit 20 is provided on the flow path of the air entered the inside space S from the ventilating unit 10.

Consequently, the air entered the inside space S from the ventilating unit 10 moves in the vertically lower portion of the inside space S toward a position facing the dehumidifying unit 20. Then, the water vapor contained in the air entered the inside space S from the ventilating unit 10 is adsorbed by the electrolysis dehumidifying element 30 (refer to FIG. 3) of the dehumidifying unit 20.

In the electrolysis dehumidifying element 30, as described above, a decomposition reaction of the adsorbed water vapor by applying a DC voltage to the first electrode layer 32 and the second electrode layer 33 (both refer to FIG. 3). Consequently, the water vapor contained in the air entered the inside space S from the ventilating unit 10 is discharged to the outside of the vehicle lamp 1 through the dehumidifying unit 20.

In the vehicle lamp 1 of the exemplary embodiment, the dehumidifying unit 20 is provided on a side close to the rear side of the vehicle and close to the ventilating unit 10 as compared to the cover lens 3.

Consequently, most of the air entered the inside space S from the ventilating unit 10 reaches the dehumidifying unit 20 before reaching the cover lens 3. As a result, the water vapor contained in the air entered the inside space S from the ventilating unit 10 is prevented from attaching to the cover lens 3 to become water droplets, and thereby occurrence of condensation or fogging on the cover lens 3 is suppressed.

Further, the vehicle lamp 1 of the exemplary embodiment includes a guide plate 9 that guides the air entered the inside space S from the ventilating unit 10 toward the dehumidifying unit 20.

As shown in FIG. 4, the air entered the inside space S in the vehicle lamp 1 changes the traveling direction thereof by butting against the guide plate 9, and is guided toward the dehumidifying unit 20. Consequently, the water vapor contained in the air becomes more likely to be adsorbed by the electrolysis dehumidifying element 30 of the dehumidifying unit 20, and becomes more likely to be discharged to the outside of the vehicle lamp 1 by the dehumidifying unit 20.

Moreover, due to the air entered the inside space S being guided by the guide plate 9 toward the dehumidifying unit 20, the water vapor contained in the air entered the inside space S from the ventilating unit 10 is prevented from heading for the cover lens 3. This further suppresses occurrence of condensation or fogging on the cover lens 3.

Note that, in the vehicle lamp 1 of the exemplary embodiment, the guide plate 9, which is a separate body from the support member 5 or the case 2, was provided; however, it may be possible to have a configuration that guides the air entered the inside space S from the ventilating unit 10 toward the dehumidifying unit 20 by, for example, changing the shape of the support member 5 or the case 2. In this case, it is unnecessary to separately provide the guide plate 9; therefore, it becomes possible to reduce the number of components of the vehicle lamp 1, and manufacturing of the vehicle lamp 1 becomes simplified.

[Other Examples of Arrangement of Ventilating Unit and Dehumidifying Unit]

Figure 5A:
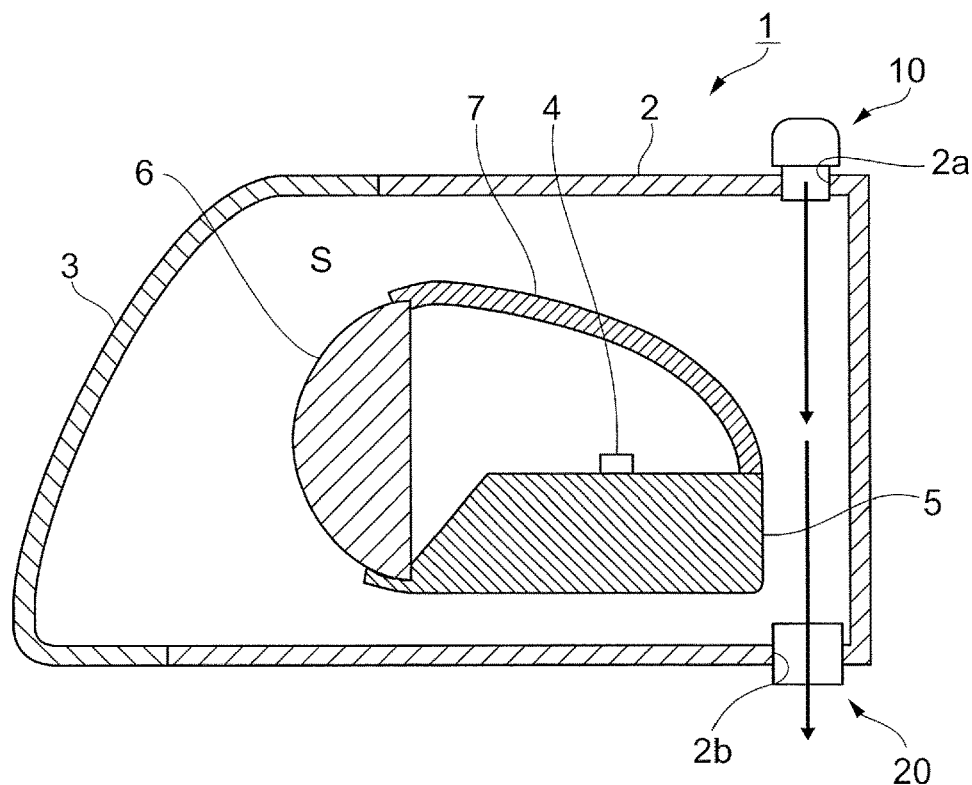
FIGS. 5A and 5B are diagrams showing other examples of a vehicle lamp including a ventilating unit and a dehumidifying unit.
Figure 5B:
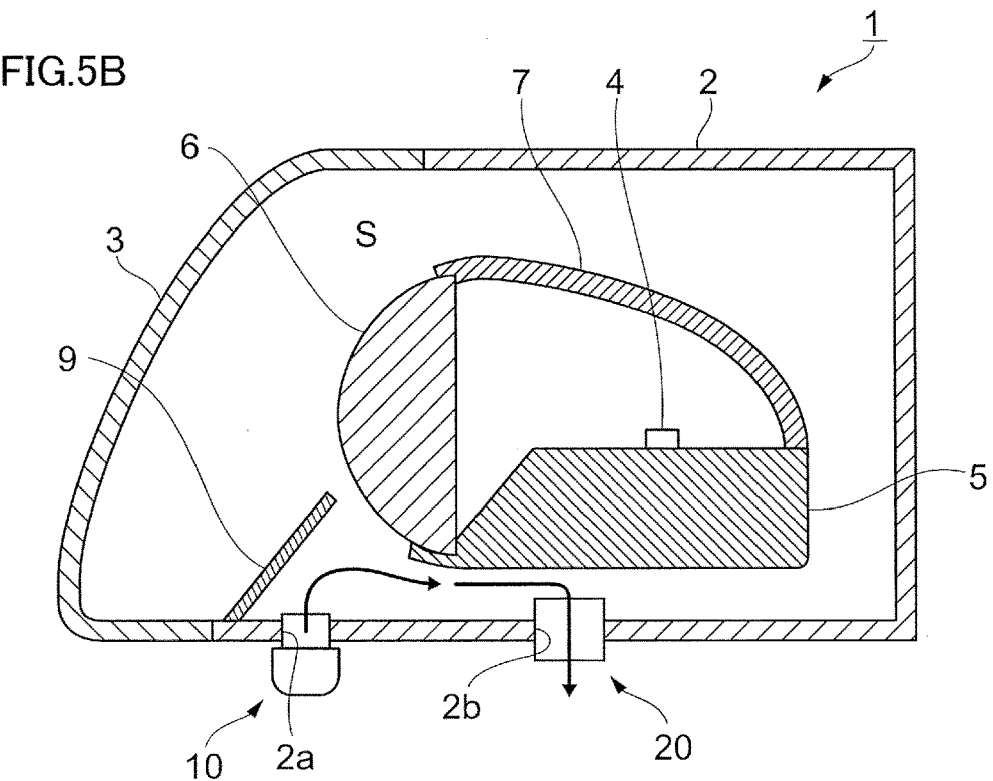

Arrangement of the ventilating unit 10 and the dehumidifying unit 20 in the case 2 of the vehicle lamp 1 is not limited to the one shown in FIG. 1. FIGS. 5A and 5B are diagrams showing other examples of the vehicle lamp 1 including the ventilating unit 10 and the dehumidifying unit 20.

In the vehicle lamp 1 shown in FIG. 5A, the ventilating unit 10 is provided on a vertically upper side of the case 2, and the dehumidifying unit 20 is provided at a position facing a vertically lower side of the ventilating unit 10 in the case 2. As described above, the air of low temperature having entered the inside space S from the outside of the vehicle lamp 1 through the ventilating unit 10 moves to the vertically lower side to head for the dehumidifying unit 20. In other words, also in the example shown in FIG. 5A, it can be said that the dehumidifying unit 20 is provided on the flow path of the air entered the inside space S through the ventilating unit 10.

Then, by arranging the ventilating unit 10 and the dehumidifying unit 20 as shown in FIG. 5A, the water vapor contained in the air entered the inside space S from the ventilating unit 10 becomes likely to be discharged to the outside of the vehicle lamp 1 through the dehumidifying unit 20. As a result, condensation or fogging on the cover lens 3 is suppressed.

Moreover, in the vehicle lamp 1 shown in FIG. 5B, both ventilating unit 10 and dehumidifying unit 20 are provided on the vertically lower side of the case 2. Moreover, in the vehicle lamp 1 shown in FIG. 5B, different from the example shown in FIG. 1, the ventilating unit 10 is provided close to the front side of the vehicle (that is, close to the cover lens 3) as compared to the dehumidifying unit 20. Further, in the vehicle lamp 1 shown in FIG. 5B, the guide plate 9 extending from the front side to the rear side of the vehicle is provided to interrupt between the ventilating unit 10 and the cover lens 3.

Then, as shown in FIG. 5B, the traveling direction of the air entered the inside space S from the outside of the vehicle lamp 1 through the ventilating unit 10 is changed by the guide plate 9, and thereby the air moves toward the dehumidifying unit 20. In other words, also in the example shown in FIG. 5B, it can be said that the dehumidifying unit 20 is provided on the flow path of the air entered the inside space S through the ventilating unit 10.

Then, by arranging the ventilating unit 10 and the dehumidifying unit 20 as shown in FIG. 5B, the air entered from the ventilating unit 10 becomes likely to be reached to the dehumidifying unit 20 before reaching the cover lens 3. Consequently, the water vapor contained in the air entered the inside space S from the ventilating unit 10 becomes likely to be discharged to the outside of the vehicle lamp 1 by the dehumidifying unit 20. As a result, condensation or fogging on the cover lens 3 is suppressed.

Note that, as described above, the ventilating unit 10 of the exemplary embodiment is provided to suppresses pressure fluctuations in the inside space S in the vehicle lamp 1. To put it another way, in the vehicle lamp 1 of the exemplary embodiment, the water vapor entered the inside space S is discharged to the outside of the vehicle lamp 1 by the dehumidifying unit 20, and accordingly, it is unnecessary to discharge the water vapor by the ventilating unit 10. Consequently, the ventilating unit 10 may have at least a size that allows air for eliminating a pressure difference to pass through when the pressure difference occurs between the inside space S and the outside of the vehicle lamp 1. In the vehicle lamp 1 of the exemplary embodiment, this makes it possible to downsize the ventilating unit 10, as compared to a case in which the water vapor is discharged by the ventilating unit 10.

Moreover, the ventilating unit 10 of the exemplary embodiment has a configuration that attach the ventilating film 11 to the case 2 of the vehicle lamp 1 via the ventilation attaching part 12. However, the configuration of the ventilating unit 10 is not particularly limited. For example, it may be possible to configure the ventilating unit 10 by directly attaching the ventilating film 11 to the first opening 2a of the case 2, or to configure the ventilating unit 10 by attaching a ventilating member made of a molded item, instead of the ventilating film 11, to the first opening 2a of the case 2.

Further, the configuration of the dehumidifying unit 20 is also not particularly limited, and it may be possible to configure the dehumidifying unit 20 by directly attaching the electrolysis dehumidifying element 30 to the second opening 2b of the case 2. Still further, in the dehumidifying unit 20, it may be possible to provide a protecting member or others for protecting the electrolysis dehumidifying element 30 on the surface of the electrolysis dehumidifying element 30.

[Timing of Performing Dehumidifying Operation]

Subsequently, timing of performing dehumidifying operations in the vehicle lamp 1 will be described. In FIG. 4, the description has been given of the case in which, when the LED 4 is lighted down in the vehicle lamp 1, the dehumidifying operation is performed by applying a DC voltage to the dehumidifying unit 20 (the electrolysis dehumidifying element 30) based on the control by the control part 60. However, the timing of performing the dehumidifying operations in the vehicle lamp 1 is not limited thereto.

In the exemplary embodiment, the dehumidifying operations may be constantly performed in the vehicle lamp 1 by, for example, energizing the dehumidifying unit 20 at all times. In this case, regardless of the environment in which the vehicle lamp 1 is placed or the status of the vehicle, the inside space S is always dehumidified, and condensation or fogging on the cover lens 3 is suppressed.

Moreover, in the vehicle lamp 1, the dehumidifying operations in the inside space S may be performed by energizing the dehumidifying unit 20 at, for example, a predetermined time, such as early morning, based on the time measured by a timer or others.

Further, in the vehicle lamp 1, the dehumidifying operations may be performed by energizing the dehumidifying unit 20 when a predetermined operation, such as an operation of opening a door, is carried out in the vehicle to which the vehicle lamp 1 is mounted.

Still further, in the vehicle lamp 1, it may be possible to provide a detection sensor that detects humidity in the inside space S in the vehicle lamp 1 or humidity of the outside of the vehicle lamp 1, and energize the dehumidifying unit 20 to perform the dehumidifying operations when the humidity detected by the detection sensor exceeds a predetermined value.

Further, in the vehicle lamp 1, it may be possible to provide a raindrop sensor to the vehicle to which the vehicle lamp 1 is mounted, and energize the dehumidifying unit 20 to perform the dehumidifying operations when rainfall is detected.

Moreover, in the exemplary embodiment, the vehicle lamp 1 has been taken as an example of the dehumidifying device that dehumidifies the inside space S by the ventilating unit 10 and the dehumidifying unit 20; however, an object to which the present invention is applied is not limited to the vehicle lamp 1. In other words, other than the vehicle lamp 1, the present invention can be applied to an optical appliance, such as a monitoring camera, with which condensation or fogging on a lens is likely to become problematic.

REFERENCE SIGNS LIST

1 Vehicle lamp
2 Case
3 Cover lens
4 LED
9 Guide plate
10 Ventilating unit
11 Ventilating film
12 Ventilation attaching part
20 Dehumidifying unit
21 Dehumidification attachment part
30 Electrolysis dehumidifying element
31 Electrolyte layer
32 First electrode layer
33 Second electrode layer
50 External power supply
60 Control part

The invention claimed is:

1. A lamp comprising:
   a light source;
   a housing that contains the light source;
   a lens that outputs light from the light source to an outside of the housing;
   a ventilating member that is provided at a first position in a surface direction in which a wall extends on the wall of the housing separating an inside and the outside of the housing that is closed, the ventilating member including a ventilating film, the ventilating film preventing a liquid and a solid from entering the inside of the housing, the ventilating film circulating a gas between the inside and the outside of the housing; and
   an electrolysis dehumidifying element that is provided at a second position in the surface direction on the wall of the housing different from the first position, the electrolysis dehumidifying element discharging water vapor inside of the housing to the outside of the housing by electrolysis,
   wherein the first position and the second position are different areas on the wall of the housing.

2. The lamp according to claim 1, wherein the ventilating member is provided at a position that allows most of the gas entered from the ventilating member to reach the electrolysis dehumidifying element before reaching the lens.

3. The lamp according to claim 1, wherein the electrolysis dehumidifying element is provided on a vertically lower side than the light source.

* * * * *